Aug. 23, 1966     C. P. BROWNING     3,267,590

EDUCATIONAL GAME APPARATUS

Filed May 8, 1964

INVENTOR.
CAROLYNN P. BROWNING.

BY Cullen, Sloman & Cantor

ATTORNEYS

United States Patent Office 3,267,590
Patented August 23, 1966

3,267,590
EDUCATIONAL GAME APPARATUS
Carolynn P. Browning, 22535 Metamora Drive,
Birmingham, Mich.
Filed May 8, 1964, Ser. No. 365,974
2 Claims. (Cl. 35—31)

The present invention relates to an educational game apparatus, and more particularly to a novel game apparatus and board over which mathematical problems and answers are applied.

It is an object of the present invention to provide an educational game apparatus which is particularly adapted for children, though not limited thereto, at various steps in their stages of mathematical education and which may be confined to mathematical exercises and problems of one type or of a series of types.

It is another object to provide an educational game apparatus which incorporates upon the game board a series of squares running in rows horizontally and vertically and wherein numbered tiles are positioned for indicating a problem such as addition, subtraction, multiplication, and division, or a mixture of such problems with accompanying answers.

It is another object to provide a game board wherein after the initial problem and answer has been applied to the game board by the application of tiles bearing indicia or numbers, subsequent problems and answers of the same or different type will be built onto the original problem extending in directions at right angles thereto in the manner of dominoes and wherein, subsequent problems will incorporate at least one or more of the numbers of a previous problem. The problems as applied to the board are all built from the original and succeeding problems and will extend in all directions from the center of the game board.

It is another object to include a game board having a series of horizontal and vertical rows of squares throughout its surface, a series of numbered tiles which may be applied to the squares, there being apertures formed in the lines which define the squares and with the apertures located intermediate the ends of the respective sides of each square and wherein, differently identified symbol markers may be applied for indicating the nature of the mathematical problem and answer.

The game apparatus also includes a plurality of tile holders for the individual players, and score sheets.

It is another object to provide a game usable at any age level, including students and adults, for educational or amusement purposes; and in the case of children to further their understanding of mathematical problems and enhance their learning, and develop skills and attitudes in solving such problems employing critical thinking, with enjoyment.

Figure 1:
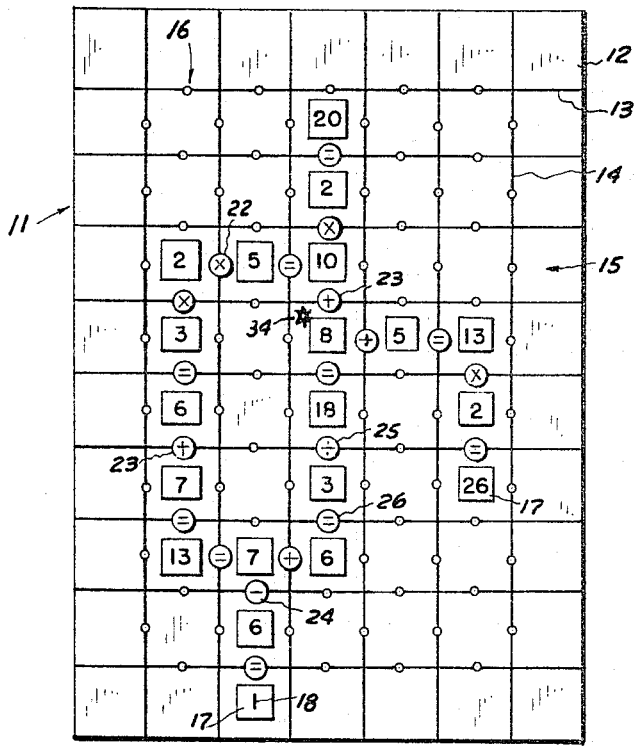
Figure 3:
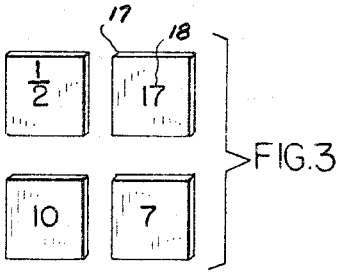
Figure 5:
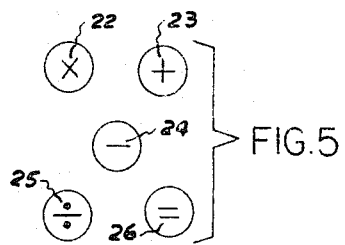
Figure 4:
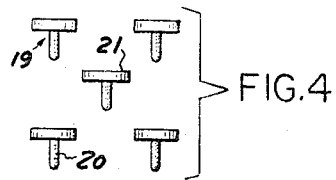
Figure 2:
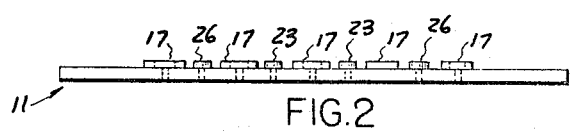
Figure 6:
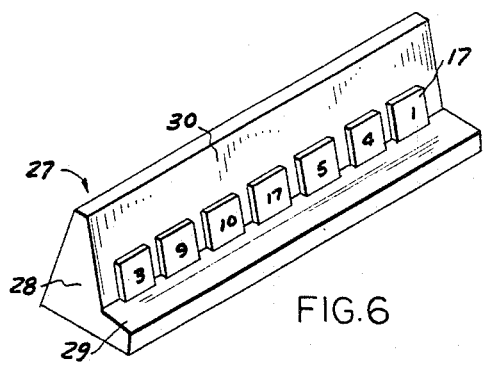
Figure 7:
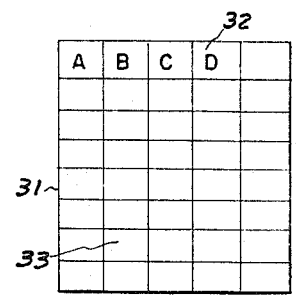

These and other objects will be seen from the following specification and claims in conjunction with the appended drawing in which:

FIG. 1 is a plan view of the game board.
FIG. 2 is an end elevational view thereof.
FIG. 3 is a perspective view of a series of numbered tiles shown in use in FIG. 1.
FIG. 4 is a front elevational view of a series of different symbol markers, as shown in use, FIG. 1.
FIG. 5 are corresponding plan views thereof.
FIG. 6 is a perspective view of a tile holder.
FIG. 7 is a plan view of a score sheet.

It will be understood that the above drawing illustrates merely a preferred embodiment of the invention, and that other embodiments are contemplated within the scope of the claims hereafter set forth.

Game board

Referring to the drawing, the present educational game apparatus employs a game board 11, said game board being square in the preferred embodiment, though any other shape may be employed, such as rectangular or circular. The game board includes a playing surface 12 which has applied thereto a series of parallel lines 13 of appreciable thickness, and an additional series of similar right angularly related parallel lines 14. This provides a series of horizontal and vertical rows of squares 15 upon the playing surface.

Apertures 16 are formed into the approximate center of each of the four sides of each square, FIG. 1, said apertures registering with the respective lines 13 and 14, to provide in the game board surface a series of longitudinally spaced apertures 16 in registery with lines 13 and 14. Apertures 16 extend around each square centrally of the individual sides to facilitate the application of the symbol markers.

The tiles

A large number of square flat tiles 17 are provided, preferably of wood or plastic or other suitable material, which have applied to their top surfaces suitable indicia 18 in the form preferably of numbers which may run from 1 to 144, for illustration. Set out hereunder is a table of numbers indicating in the second column the possible quantity of each number which may be employed for the best utilization of the game and in the third column a more limited quantity of each of the numbers which may be effectively used in playing the game.

| N | Quan. | Quan. | N | Quan. | Quan. | N | Quan. | Quan. |
|---|---|---|---|---|---|---|---|---|
| 1 | 11 | 7 | 25 | 1 | 1 | 64 | 1 | 1 |
| 2 | 24 | 12 | 27 | 2 | 1 | 66 | 2 | 1 |
| 3 | 24 | 12 | 28 | 2 | 1 | 70 | 2 | 1 |
| 4 | 24 | 12 | 30 | 4 | 2 | 72 | 4 | 2 |
| 5 | 24 | 12 | 32 | 2 | 1 | 77 | 2 | 1 |
| 6 | 24 | 12 | 33 | 2 | 1 | 80 | 2 | 1 |
| 7 | 24 | 12 | 35 | 2 | 1 | 81 | 1 | 1 |
| 8 | 24 | 12 | 36 | 5 | 3 | 84 | 2 | 1 |
| 9 | 24 | 12 | 40 | 4 | 2 | 88 | 2 | 1 |
| 10 | 26 | 13 | 42 | 2 | 1 | 90 | 2 | 1 |
| 11 | 24 | 12 | 44 | 2 | 1 | 96 | 2 | 1 |
| 12 | 27 | 13 | 45 | 2 | 1 | 99 | 2 | 1 |
| 14 | 2 | 1 | 48 | 4 | 2 | 100 | 1 | 1 |
| 15 | 2 | 1 | 49 | 1 | 1 | 108 | 2 | 1 |
| 16 | 3 | 2 | 50 | 2 | 1 | 110 | 2 | 1 |
| 18 | 4 | 2 | 54 | 2 | 1 | 120 | 2 | 1 |
| 20 | 4 | 2 | 55 | 2 | 1 | 121 | 1 | 1 |
| 21 | 2 | 1 | 56 | 2 | 1 | 132 | 2 | 1 |
| 22 | 2 | 1 | 60 | 4 | 2 | 144 | 1 | 1 |
| 24 | 5 | 3 | 63 | 2 | 1 | | | |

While the foregoing schedule above omits certain numbers, it is contemplated that the numbers could be successive 1 to 144 or any other top number, as desired depending upon the scope of the game.

These individual tiles are selectively applied by the players in accordance with the rules so as to designate mathematical problems and answers upon the game board surface, as shown for illustration in FIG. 1.

Symbol markers

A plurality of mathematical symbol markers 19 are shown in FIG. 4, each of which includes an elongated cylindrical shank 20 and at its upper end a circular cap 21, which could be of any other shape. As shown in FIG. 5, suitable indicia 22–26 is applied respectively to said caps, the number 22 indicating a "multiplication" sign, 23 an "addition" sign, 24 a "subtraction" sign, 25 a "division" sign, and 26 an "equals" sign.

In using the game apparatus, for any particular problem, the player applies one of the symbol markers 22, 23, 24, 25, and the "equals" marker 26.

For the convenience of the players, there are provided a series of tile holders 27, FIG. 6. These are formed of a block 28 of plastic or wood or other material which includes a support platform 29 and an inclined tile rest 30, adapted to receive the correct number of tiles, as maintained by each player during the game.

Score sheets

There are employed a plurality of score sheets 31, FIG. 7, normally arranged in pads for the use of the players. Each sheet, for illustration, includes a suitable heading 32 for the names of the players, such as A, B, C, and D, and has a series of columns 33 by which the players may keep running scores.

Operation of game

The tiles 17 are progressively applied in registry with the game board squares 15 for indicating a particular mathematical problem and answer, extending horizontally or vertically. After the initial problem has been applied to the central portion of the game board corresponding to the star mark 34, FIG. 1, successive problems and answers extend at right angles to the line of any previous problem using at least one of the numbers of the previous problem. It is contemplated that two numbers of a previous problem or pair of problems could be employed, FIG. 1, and the application by a player of a single number, such as 7, between the numbers 6 and 13 with "plus" and "equals" signs applied.

During the playing of the game considerable choice is provided to the players as to the type of problem, addition, subtraction, division or multiplication. Ultimately, the entire game board will be substantially filled by the tiles, such as shown in FIG. 1.

For illustration, only, the game may be played and following rules applied:

(1) Complete collection of tiles are applied to a table or other surface face down.

(2) Each player draws one tile. The player with the highest number starts the game. Each player draws 8 tiles.

(3) The first player will apply a mathematical problem to the board either horizontally or vertically, with one of the three tiles resting on the star 34, merely to provide a central starting point. He also applies the correct marker symbols. The player completes his turn by announcing his score which may be the answer of the problem. It may be a sum, a quotient, a product, or a "difference" in subtraction. For the score arrived at, the players will use the score sheets 31, FIG. 7, to mark the individual scores of the players A, B, C, and D, for illustration, shown at 32. Preferably, there will be one score keeper and the scores will be added as the game proceeds to give totals for the individual players.

In some situations using the answer may not be fair to all players, particularly in "subtraction" and "division" problems. The rules may be modified to show that the "answer" in these problems may be doubled for scoring purposes or alternately the sum of the numbers employed are added.

After the first player has completed his turn and has announced his score, he then draws as many tiles from the supply as may be needed to maintain eight tiles on his rack 27, assuming eight is the number which has been agreed upon to be used by each player.

(4) The play then passes to the left in a clockwise direction and thus, the second player and the other players in turn add numbers to the first combination to progressively provide new mathematical combinations. Also, the correct symbol marker for the combination desired must be selected from a supply kept by each player. For illustration, there is shown: the addition, 10 plus 8 equals 18. In this first problem, the 8 has been applied to the center or starting square 34. Thus, the score of the first player would be 18, for illustration, which would be marked upon the score sheet, FIG. 7.

The next player, for example, might apply the two tiles numbered 2 and 5 with a "multiplication" marker symbol 22 and an "equals" symbol 26 to thus show 2 times 5 equals 10. This second problem uses one of the numbers 10 from the earlier problem. Additional tiles and the appropriate symbol markers 22–25 are applied to the game board, as an inspection of FIG. 1 will show. In each case an "equals" sign, symbol marker 26, is provided.

Thus, built upon the 2 times 5 equals 10 is the product 2 times 3 equals 6, 18 divided by 3 equals 6, 6 plus 7 equals 13, and in the vertical problem, 6 plus 7 equals 13. In the latter case, only a single number 7 has been applied by the user to fit between the two numbers 6 and 13. Normally, the players would prefer to use more number tiles since this would enhance their scores. However, there will be situations where a single remaining tile is needed and has to be used since it is among the collection of eight tiles, for example, upon the player's holder, FIG. 6.

(5) No numbered tiles once applied to the board may be shifted, i.e., once they form the part of a correct problem. A player who cannot make a number combination may use his turn to merely replace any missing tiles on his holder 27 up to the minimum number required and forfeit his turn. The play will continue around the game board until all players have played and until all the tiles have been used up, in accordance with the rules or alternately until a particular player has achieved a score, such as 100 or 200 or 250 and so forth.

(6) Whenever the game does end, each player's score is reduced by the sum of his unplayed tiles.

Having described my invention, reference should now be had to the following claims.

I claim:

1. An educational game apparatus comprising a rectangular game board having a playing surface;

a series of parallel lines and right angularly related parallel lines applied to the playing surface providing intersecting horizontal and vertical rows of squares thereon;

there being an aperture formed into the center of each of the four sides of each square, said apertures registering with said lines;

a large number of square flat tiles of a size smaller than said squares, selectively positionable respectively upon the playing surface in a row within some of said squares;

numerical indicia on each tile, adapted for use in a completed mathematical problem and answer; and a plurality of mathematical symbol markers, each including a shank adapted for selective positioning respectively in apertures between the tiles applied;

each problem requiring a pair of symbol markers;

a cap on each shank; and indicia on each cap taken from the group consisting of "plus," "minus," "multiplication," "division," and "equals" signs.

2. In the educational game apparatus of claim 1, the tiles being progressively applied to the game board squares for indicating a problem and answer in one of two directions;

with successive problems and answers extending at right angles to the line of any previous problem and using at least one of its numbers;

with the result that all problems incorporate a part of a previous problem, so as to extend over the surface of the game board in horizontal and vertical directions.

References Cited by the Examiner

UNITED STATES PATENTS

| | | | |
|---|---|---|---|
| 2,320,832 | 6/1943 | Schoenberg et al. | 35—31.6 |
| 2,174,753 | 3/1965 | Miller | 35—35.8 X |

FOREIGN PATENTS

| | | |
|---|---|---|
| 465,979 | 5/1937 | Great Britain. |

EUGENE R. CAPOZIO, *Primary Examiner.*

WILLIAM GRIEB, *Assistant Examiner.*